United States Patent [19]
Hallmark et al.

[11] Patent Number: 6,014,656
[45] Date of Patent: Jan. 11, 2000

[54] USING OVERLAPPING PARTITIONS OF DATA FOR QUERY OPTIMIZATION

[75] Inventors: Gary Hallmark, San Carlos; Robert J. Jenkins, Foster City, both of Calif.

[73] Assignee: Oracle Corporation, Redwood Shores, Calif.

[21] Appl. No.: 08/673,714

[22] Filed: Jun. 21, 1996

[51] Int. Cl.[7] .................................................. G06F 17/30
[52] U.S. Cl. ..................... 707/2; 707/3; 707/4; 707/5; 707/8
[58] Field of Search ................. 707/2, 3, 4, 201, 707/203, 5, 6, 7, 8, 10; 382/283; 364/283, 974, 221, 232, 282, 949; 702/103, 104, 102; 705/35; 709/201; 400/110, 70

[56] References Cited

U.S. PATENT DOCUMENTS

| | | | |
|---|---|---|---|
| 5,497,486 | 3/1996 | Stolfo et al. | 707/7 |
| 5,615,361 | 3/1997 | Leung et al. | 707/3 |
| 5,724,573 | 3/1998 | Agrawal et al. | 707/6 |
| 5,758,145 | 5/1998 | Bhargava et al. | 707/2 |
| 5,761,653 | 6/1998 | Schiefer et al. | 707/2 |
| 5,794,229 | 8/1998 | French et al. | 707/2 |
| 5,813,005 | 9/1998 | Tsuchida et al. | 707/2 |
| 5,864,842 | 1/1999 | Pederson et al. | 707/3 |
| 5,870,735 | 2/1999 | Agrawal et al. | 707/3 |

OTHER PUBLICATIONS

Alon Y. Levy, Inderpal Singh Mumick, Yehoshua Sagiv, Query Optimization by Predicate Move–Around, Proceedings of the 20th VLDB Conference, Santiago, Chile, 1994, pp. 96–107.

David J. DeWitt, Shahram Ghandeharizadeh, Donovan A. Schneider, Allan Bricker, Hui–I Hsiao, Rick Rasmussen, *The Gamma Database Machine Project, IEEE Transactions on Knowledge and Data Engineering*, vol. 2, No. 1, Mar. 1990, pp. 44–62.

*Primary Examiner*—Paul R. Lintz
*Assistant Examiner*—Thu-Thao Havan
*Attorney, Agent, or Firm*—McDermott, Will & Emery

[57] ABSTRACT

A method and apparatus for executing queries on a set of data that has been partitioned into a plurality of partitions based on a partitioning key is provided. A query is received that includes a reference to a second key. The second key is not part of the partitioning key but has a predetermined correlation with the partitioning key. This second key is referred to as an overlapping partition key. A subset of the plurality of partitions is selected to be scanned based on the reference to the second key and the predetermined correlation with the partitioning key. The query is then executed by scanning only those partitions of the plurality of partitions that belong to the subset of partitions. The overlapping partition key provides for reduced query execution time even when the partitioning key is not directly involved in the query. Specifically, the overlapping partition key permits a partial table scan in situations that would require a fill table scan with partitioning alone.

37 Claims, 9 Drawing Sheets

|  | ORDER # | SHIP DATE | RECEIVE DATE | ITEMS |
|---|---|---|---|---|
| PARTITION 1 | 1<br>2<br>3<br>4<br>5 | 1/16/68<br>2/2/68<br>3/8/68<br>6/7/68<br>12/10/68 | 3/12/68<br>5/1/68<br>3/23/68<br>9/1/68<br>3/2/69 | 21<br>8<br>17<br>3<br>100 |
| PARTITION 2 | 6<br>7<br>8<br>9<br>10<br>11 | 1/20/69<br>1/30/69<br>2/27/69<br>5/15/69<br>8/9/69<br>12/29/69 | 3/11/69<br>2/27/69<br>4/20/69<br>6/1/69<br>10/20/69<br>1/16/70 | 12<br>200<br>53<br>8<br>75<br>50 |
| PARTITION 3 | 12<br>13<br>14 | 5/6/70<br>9/24/70<br>10/31/70 | 8/4/70<br>11/21/70<br>12/23/70 | 10<br>24<br>50 |
| PARTITION n | 501287<br>501288<br>501289<br>501290 | 1/3/96<br>3/12/96<br>7/8/96<br>12/15/96 | 2/20/96<br>6/10/96<br>10/6/96<br>2/18/97 | 100<br>10<br>35<br>50 |

The SHIP DATE column is the PARTITIONING KEY.

FIG. 9

USING OVERLAPPING PARTITIONS OF DATA FOR QUERY OPTIMIZATION

FIELD OF THE INVENTION

The invention relates generally to the field of database management systems. More specifically, the invention relates to query optimization.

BACKGROUND OF THE INVENTION

When a relational database has very large tables consisting of potentially millions of rows, for example, it is desirable to divide the tables into subtables ("partitions") of a more manageable size. The operation of dividing a table into partitions is typically accomplished with a partitioning key. A partitioning key is a key that is used to determine to which partition a particular record (row) belongs. The partitioning key can be defined in terms of one or more attributes (columns) of the table. The resulting partitioned table consists of several partitions, each containing the same columns as the partitioned table. However, each partition contains only a subset of the rows of the partitioned table.

Partitioning a table has a positive effect on query processing. By using information regarding the partitioning scheme of a table, the amount of time required to execute a query that accesses the table may be reduced. As will be illustrated further with reference to FIG. 1, partitioning allows a query to be processed with a partial table scan rather than a full table scan if the query involves a predicate containing the partitioning key. If the query involves the partitioning key, the number of partitions that need to be searched may be reduced prior to executing the query. For example, the query optimizer can generate a query plan that excludes partitions that cannot possibly contain rows that satisfy the user specified conditions.

Figure 1:
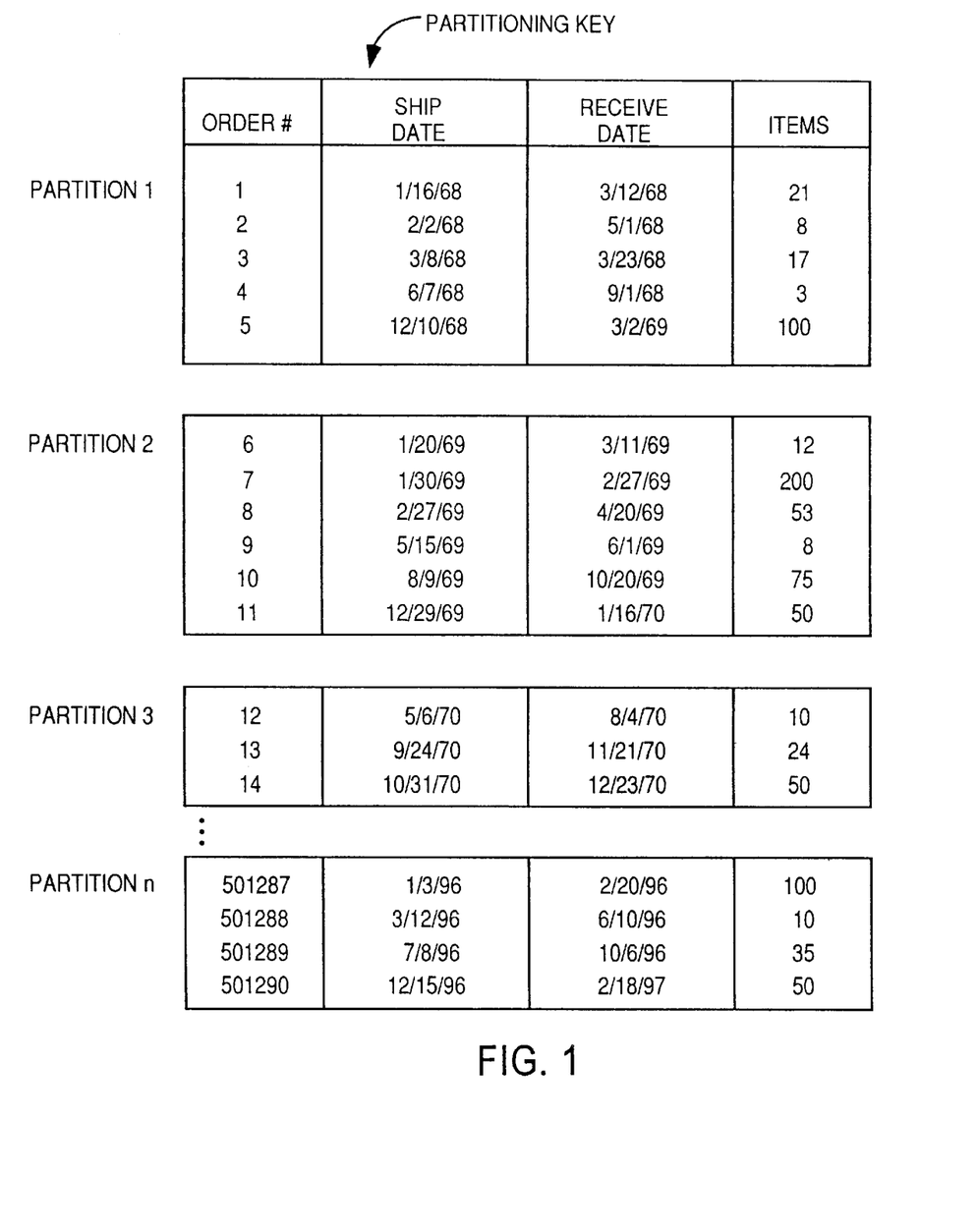
FIG. 1 is a table divided into partitions by a partitioning key.

FIG. 1 is a simple table with four columns: order #, ship date, receive date, and items. The table is partitioned by the ship date column. More specifically, the table is partitioned by the year of the ship date. Therefore, records having the same ship date year are stored in the same partition. The table contains n partitions, partition 1 contains records having a ship date year of 1968, partition 2 contains records with a ship date year of 1969, partition 3 contains records with a ship date year of 1970, partitions 4 through n-1 (not shown) contain ship date years 1971 through 1995, and partition n contains records with a ship date year of 1996.

To illustrate how partitioning can be used to reduce query execution time, assume the user has requested to see a list of records with fifty or more items and shipped in the year 1969. In this example, the first partition can be skipped altogether because it contains records associated with ship dates occurring in the year 1968. Partitions 3 through n can also be skipped because none contain records having a ship date year of 1969. The query plan generated by the query optimizer accordingly can be limited to a search of partition 2.

As illustrated above, partitioning is useful for reducing the amount of time required to execute a query. However, the advantages of this technique can only be enjoyed when the query contains a predicate directly involving the columns in the partitioning key. Referring again to FIG. 1, if the user had requested a list of records having 50 or more items and a receive date in 1970, then the query optimizer would be unable to eliminate any of the partitions from the query plan. As a result, all of the partitions would have to be searched. Therefore, in this example, partitioning has provided no benefit at all. This example illustrates the limitations inherent in this partitioning method. The value of partitioning to query optimization is limited to situations where the query uses the partitioning key directly.

It is desirable, therefore, to provide reduced query execution time even when the partitioning key is not directly involved in the query. It is also desirable to maintain and recognize per-partition predicates on something other than the partitioning key that can be used by the query optimizer to treat individual partitions differently. When values in a set of one or more columns are correlated to the columns of the partitioning key, it is desirable to take advantage of this correlation to optimize queries.

SUMMARY OF THE INVENTION

A method and apparatus for executing queries on a set of data that has been partitioned into a plurality of partitions based on a first key is disclosed. A query is received that includes a reference to a second key. The second key is not part of the first key but has a predetermined correlation with the first key. A subset of the plurality of partitions is selected to be scanned based on the reference to the second key and the predetermined correlation with the first key. The query is then executed by scanning only those partitions of the plurality of partitions that belong to the subset of partitions.

According to one aspect of the invention, a set of query predicates is determined from the query. A set of selection predicates is created and initialized with the set of query predicates. One or more predicates that represent the second key's predetermined correlation with the first key are added to the set of selection predicates. Then, the set of selection predicates is used to determine the subset of partitions to be scanned.

According to another aspect of the invention, after the predicates have been added to the set of selection predicates, new predicates are transitively generated based on the predicates in the set of selection predicates. The new predicates are added to the set of selection predicates.

Then, those of the one or more predicates that represent the correlation between the first and second key and the newly generated predicates that are not constant predicates are removed from the set of selection predicates. Also, any of the newly generated predicates that can produce a result of UNKNOWN are removed from the set of selection predicates.

Selecting the subset of partitions to scan is accomplished by evaluating the constant predicates in the set of selection predicates. The partitions that are included in the subset of partitions to be scanned are those partions that correspond to selection predicates containing constant predicates that evaluate to TRUE or UNKNOWN.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for recognizing overlapping partition keys (OPkeys) and telling the query optimizer about them is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 2:
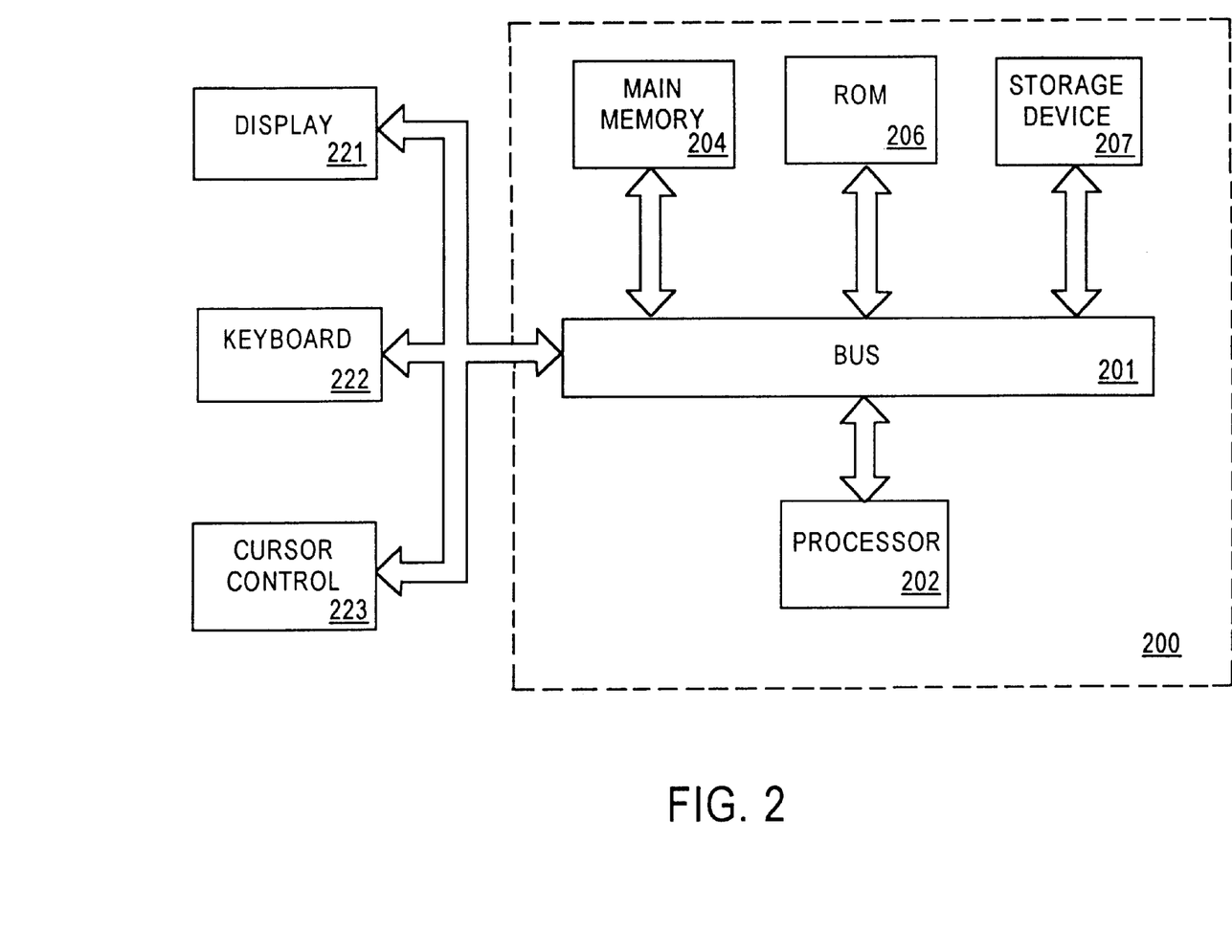
FIG. 2 is an example of a typical computer system upon which one embodiment of the present invention can be implemented.

Referring to FIG. 2, a computer system is shown as 200. The computer system 200 represents a node (site) within a distributed processing system upon which the preferred embodiment of the present invention can be implemented. The hardware architecture of nodes within the distributed processing system can be varied and diverse. There is no requirement in the present invention that each node have equivalent and compatible processing systems. It is only necessary that each node of the distributed processing system be able to communicate on a network or some communication path coupling the nodes together. Computer system 200 comprises a bus or other communication means 201 for communicating information, and a processing means 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202. Data storage device 207 is coupled to bus 201 for storing information and instructions.

A data storage device 207 such as a magnetic disk or optical disc and its corresponding drive can be coupled to computer system 200. Computer system 200 can also be coupled via bus 201 to a display device 221, such as a cathode ray tube (CRT), for displaying information to a computer user. An alphanumeric input device 222, including alphanumeric and other keys, is typically coupled to bus 201 for communicating information and command selections to processor 202. Another type of user input device is cursor control 223, such as a mouse, a trackball, or cursor direction keys for communicating direction information and command selections to processor 202 and for controlling cursor movement on display 221. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 222 wherein all interface is provided via the stylus as a writing instrument (like a pen) and the written text is interpreted using optical character recognition (OCR) techniques.

Another device which may optionally be coupled to bus 201 is a hard copy device 224 which may be used for printing instructions, data or other information on a medium such as paper, film, or similar types of media. In the preferred embodiment, a communication device 225 is coupled to bus 201 for use in accessing other nodes of the distributed system via a network. The communication device 225 may include any of a number of commercially available networking peripheral devices such as those used for coupling to an Ethernet, token ring, Internet, or wide area network. Note that any or all of the components of the system illustrated in FIG. 2 and associated hardware may be used in various embodiments of the present invention; however, it will be appreciated by those of ordinary skill in the art that any configuration of the system may be used for various purposes according to the particular implementation.

The present invention is related to the use of computer system 200 to reduce the execution time of queries executed on a set of data. As computer system 200 executes a program, the processor 202 accesses data stored in a data dictionary within main memory 204 to facilitate query optimization. Importantly, the present invention is not limited to having all partitions located on the same computer system. Rather, the partitions might be spread over several databases in a distributed network of databases.

Overlapping Partition Keys

As discussed earlier, dividing a table into partitions allows query execution time to be reduced by removing from consideration those partitions that cannot possibly contain rows that satisfy specified query conditions. However, this benefit can only be achieved when the query directly involves the partitioning key. Therefore, it is desirable to provide a solution that can reduce query execution time even when the partitioning key is not directly involved in the query.

An overlapping partition key (OPkey) is a set of columns in a partitioned table whose values are strongly correlated to the partitioning key of that table. Overlapping partition keys allow the system to remove from consideration many of the table's partitions at compile time. OPkeys permit partial table scans in situations that would require full table scans with partitioning alone. This advancement is illustrated with reference to FIG. 3.

Figure 3:
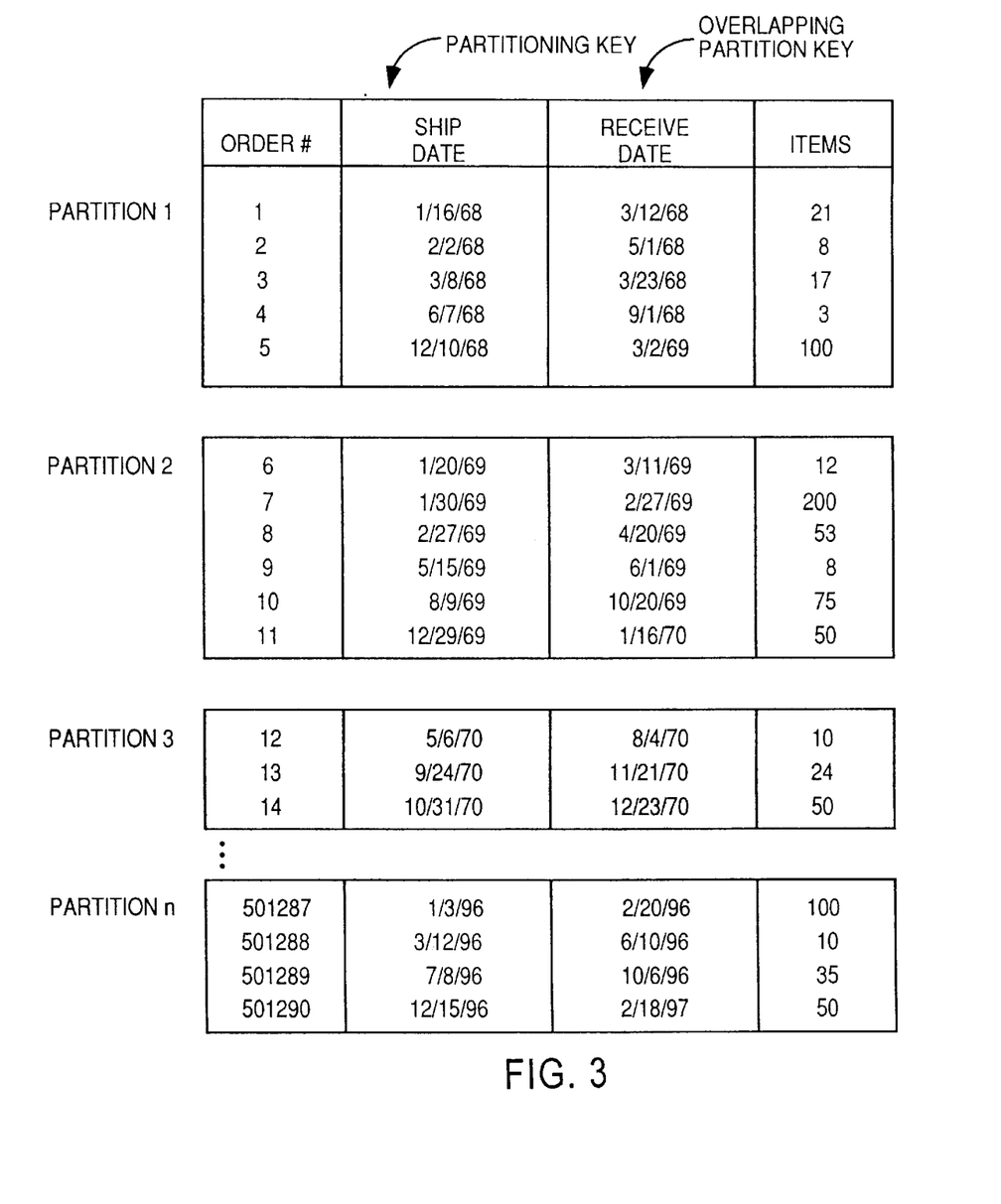
FIG. 3 is a table partitioned as the table of FIG. 1 with the addition of an overlapping partition key according to one embodiment of the present invention.

FIG. 3 is a table partitioned as the table of FIG. 1 with the addition of an overlapping partition key according to one embodiment of the present invention. The only difference between FIG. 1 and FIG. 3 is the designation of the receive date column as an overlapping partition key. A previous example, discussed with respect to FIG. 1, involved a user request for a list of records having 50 or more items and a receive date in 1970. That example illustrated a query that would require a full table scan when only a partitioning key is used. The same query on the table of FIG. 3, however, can be executed in a fraction of the time by using a known relationship between the partitioning key and the OPkey. In the illustrated table, the values stored in the receive date column are highly correlated to the corresponding values stored in the ship date column. Specifically, values in the receive date column are always greater than or equal to the corresponding values in the ship date column and the receive date is within three months of the corresponding ship date.

The database management system can take advantage of the OPkey's relationship to the partitioning key to optimize queries. For example, to find the records having 50 or more items and a receive date in 1970, only partitions having a ship date that can meet the known relationship given the fact that the receive data is in 1970 need to be scanned.

Therefore, in this example, those partitions whose highest ship date is less than 10/1/69 (3 months prior to 1/1/70) can be removed from consideration. Accordingly, partition 1 of FIG. 3 does not need to be scanned. None of the ship dates in partition 1 can satisfy the known relationship because none of the ship dates in this partition are within 3 months of 1970.

Also, those partitions whose lowest ship date is greater than 12/31/70 can be removed from consideration. Accordingly, partitions 4 through n do not need to be scanned. None of the ship dates in partitions 4 through n can satisfy the known relationship because all of the ship dates in these partitions have a ship date that is greater than 1970.

In this example, therefore, only partition 2 and partition 3 need to be scanned to find the requested records. As this example illustrates, not every search involving the OPkey can be limited to a single partition. Generally, the OPkey's partition of rows is neither a finer nor a coarser partition of the partitioning key's partition. From this perspective, the OPkey can be thought of as producing another set of partitions overlapping the partitions created by the partitioning key; hence, the name "overlapping partition key."

In the following discussion, embodiments of the invention shall be described with reference to a table that has been partitioned. However, the format in which the partitioned data is stored will vary from implementation to implementation. For example, one or more attributes of an object type may be used as an OPkey for searches performed on a set of objects of the object type that have been grouped (partitioned) according to a different set of one or more attributes of the object type. Consequently, the present invention is not limited to the use of OPkeys on partitions that group any particular type or format of data.

Figure 4:
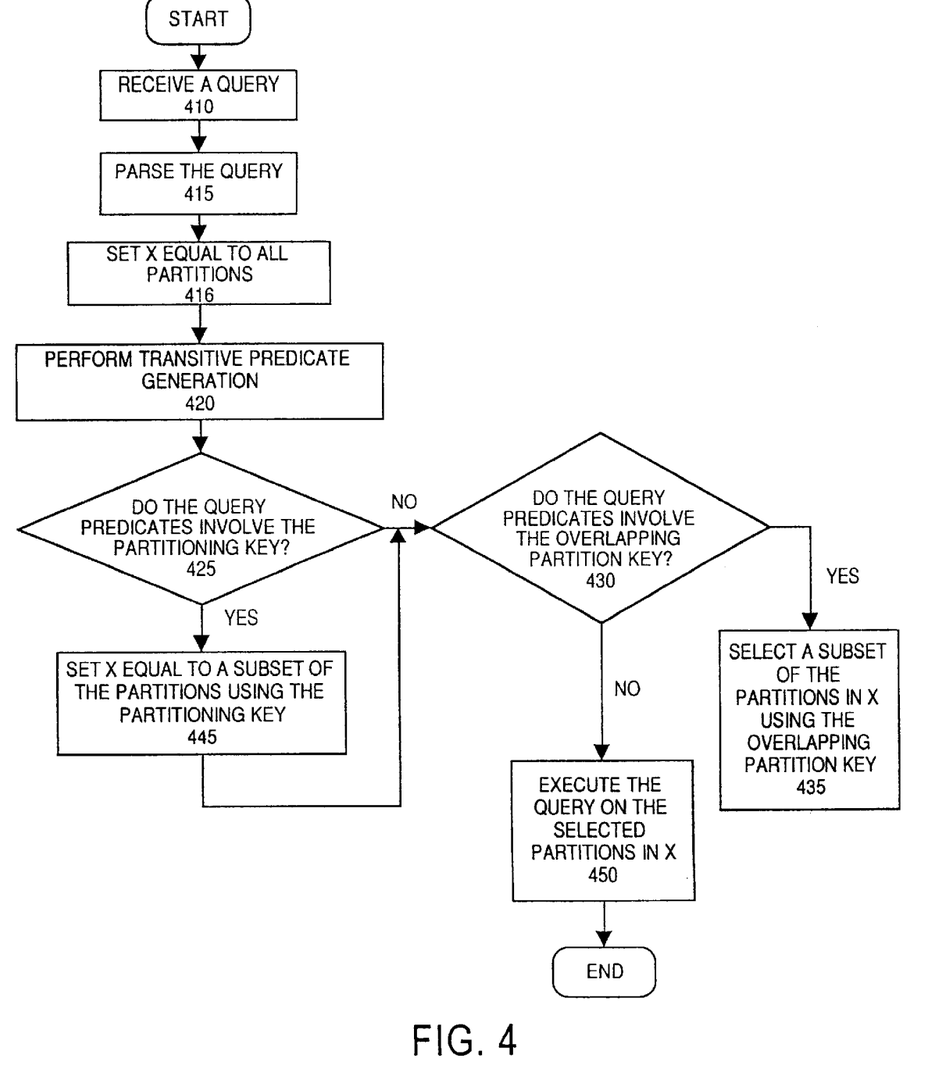
FIG. 4 is a flow diagram illustrating a method of executing queries according to one embodiment of the present invention.

FIG. 4 is a flow diagram illustrating a method of executing queries according to one embodiment of the present invention. It is assumed that a set of data, here a table, has been divided into a plurality of partitions by a partitioning key. Another presumption is that an OPkey has been defined that has a strong correlation with the partitioning key.

At step 410, a query is received. The query is parsed in step 415. At step 416, a set, X, representing the partitions selected for query execution is initialized to include all the table's partitions. Transitive predicate generation is performed in step 420. The generation of new predicates and transitive predicate generation shall be described in greater detail below. In step 425, it is determined if the query predicates involve the partitioning key.

If the query predicates are determined to involve the partitioning key, X is set to a subset of the table's partitions using the partitioning key in step 445. This selection can be accomplished by choosing only the partitions that could possibly contain the values involved in the query predicates. Since a query might refer to both keys, upon completion of step 445 processing continues at step 430.

Returning to step 425, if the partitioning key is not involved in the query predicates, X remains set to all the table's partitions and the method continues at step 430.

At step 430, it is determined whether or not the query predicates involve the OPkey. If the query predicates involve the OPkey, a subset of the partitions in the set X is selected using the OPkey. This selection can be performed with reference to the known correlation between the OPkey and the partitioning key and the query predicates. For example, a table for a telephone directory partitioned on area codes might have a name column and a zip code column. The name column is relatively independent of the partitioning key, area code. While the zip code column is highly correlated to the area code column. Once the user observes the correlation between the area code and the zip code columns, the user can define a set of rules or correlation predicates to describe the relationship. Then, a query involving a specific zip code can be limited to a scan of the partitions containing area codes that meet the defined relationship.

Returning to step 430, if it is determined that the query predicates do not involve the OPkey, then X remains unaltered. Since X was initialized to contain all the table's partitions, if the query predicates involve neither the partitioning key nor the OPkey, then all the partitions remain selected when processing flows to step 450.

After the partitions have been selected, the query is executed upon the selected partitions in set X at step 450. Importantly, not all of the selected partitions will have to be searched. Those partitions that can be evaluated to FALSE in constant time can be skipped. Thus, some partitions can still be optimized away during this execution phase.

Although OPkeys will now be described with reference to specific embodiments, many alternative embodiments are available for implementing the query execution technique using OPkeys described above. Therefore, the specific embodiments described should be regarded in an illustrative rather than a restrictive sense.

Selection Predicates

A selection predicate, $sel_i$, is a logical expression that provides a way of excluding the corresponding partition from the query plan at compile time ("optimizing away"). Generally, selection predicates are built by combining three sets of predicates: (1) partitioning predicates, (2) query predicates, and (3) correlation predicates. The steps involved in building selection predicates from the three sets of predicates and applying the selection predicates will be discussed in detail below.

Partition i can be excluded from the query plan, if, at anytime during the building of selection predicates, it is determined that the corresponding selection predicate, $sel_i$, must evaluate to FALSE for all the rows in partition i. For example, if the selection predicate for partition 1 of FIG. 3, was reduced to only constant predicates (4/19/68>=1/1/68) and (4/19/68<=3/31/69), then the result would be TRUE for every row in partition 1. If the selection predicate for partition 2 was reduced to constant predicates (4/19/68>=1/1/69) and (4/19/68<=3/31/70), then the result would be FALSE for every row in partition 2. Therefore, in this example, partition 2 would be excluded from the query plan at compile time and partition 1 would remain in the query plan to be evaluated at run-time.

Per-partition Predicates

Per-partition predicates are separate and independent predicates that are stored for each partition of the table. Per-partition predicates may include both primary and secondary partitioning predicates. For example, one predicate corresponding to the primary partitioning key for partition 1 of FIG. 3 might be (ship date>=1/1/68).

The correlation predicates that define the relationship between the OPkey and the primary partitioning key result in secondary partitionings of the table. Generally, secondary partitionings can be specified in one of two ways. First, a secondary partitioning key might be specified by a set of predicates, $S_i$, for each partition. Also, a secondary partitioning key might be defined by a single predicate, S, that relates the secondary partitioning key to another partitioning key. It is not necessary that all n $S_i$ be explicit. It is possible that a single constraint, involving a reference to the primary partitioning key can be specified. Then transitivity and simple arithmetic manipulation can automatically be used to infer the $S_i$. For example, (received date>=ship date) and (received date<=ship date+90 days) can be used to generate the n received date partitioning predicates by substituting the lowest and highest ship dates for each partition into the single constraint. Further, the $S_i$ can be avoided altogether by using transitivity to rewrite the query predicate to reference ship date instead of received date. For example, a query predicate (received date=x) can be turned into (ship date<=x) and (ship date>=x−90)—an exact match is turned into a range query.

The secondary partitioning predicates (correlation predicates) can be based upon many alternative representations of the known relationship between the OPkey and the primary partitioning key. For example, the predicates might be represented with a check constraint for each partition or a single check constraint with per-partition constraint templates.

Check constraints are logical expressions that define a range of values that are acceptable for a column within a corresponding set of rows. For example, the check constraint (items>=0) might be used to ensure that no row is added to the table with a value below zero. A constraint template is a place holder in a logical expression that will have a data value substituted for it prior to the evaluation of the expression. For example, in the predicate (items<=max items), max items is a variable that can have different values bound to it for each partition. For partition 1, max items might be set to 100, and for partition 2, max items might be set to 200.

Other alternatives include the tracking of high and low values for each partition for use in building predicates: (OPkey<=:high) and (OPkey>=:low), or an index on the OPkey could be traversed to find the high and low values for each partition. Further, if the partitions are constrained to not overlap, an ordered list of high keys or low keys could be maintained for each partition. The variables ":high" and ":low" in the above predicates are referred to as host variables. Host variables are evaluated during query execution by calling a designated routine which in turn will return the value to be substituted for the host variable in the expression. In the example predicates above, routines would be invoked to perform the index traversal to return the high or low value for a given partition.

Figure 5:
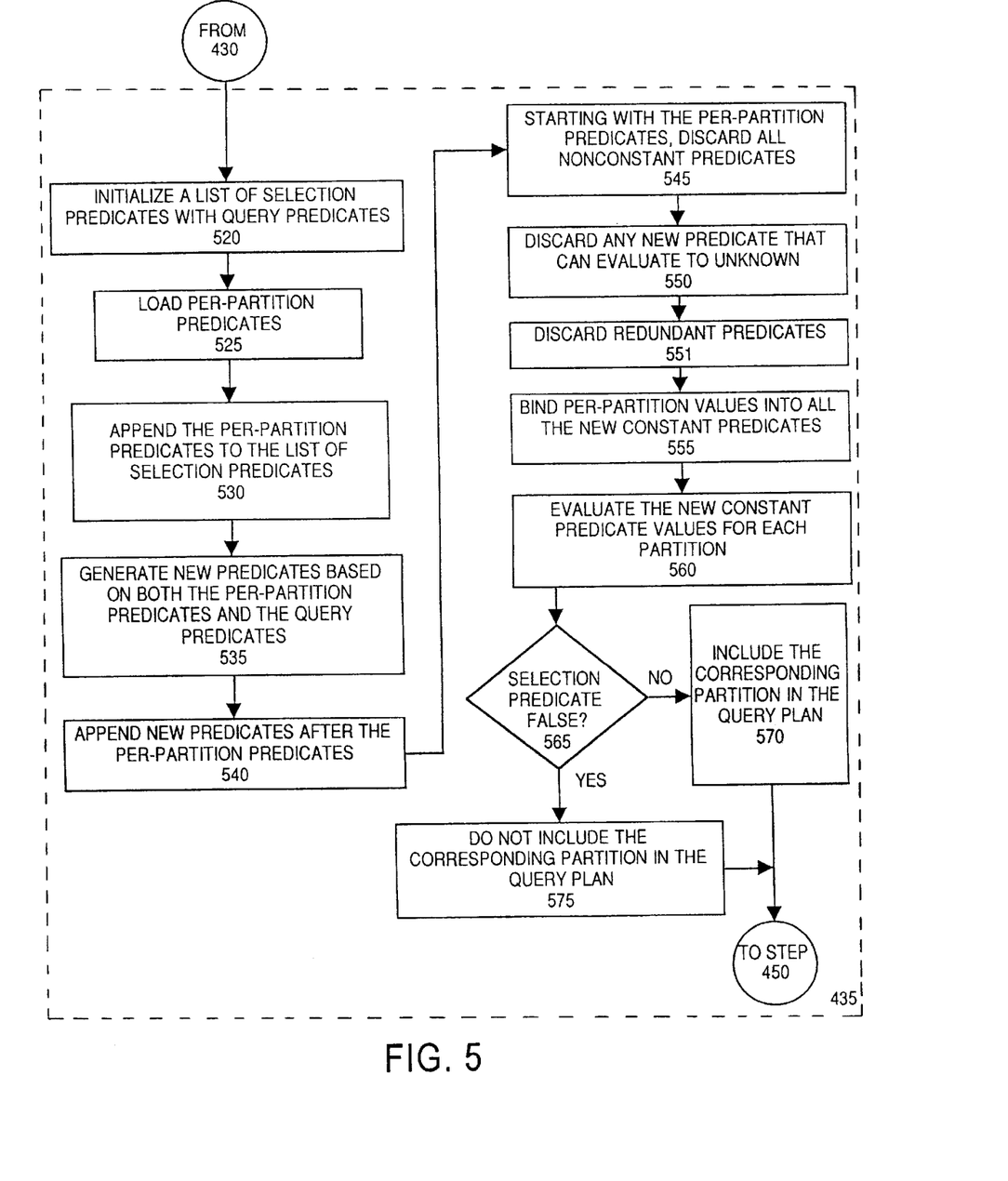
FIG. 5 is a flow diagram illustrating a method of selecting a subset of partitions using an overlapping partitioning key (step 435 of FIG. 4) according to one embodiment of the present invention.

Referring now to FIG. 5, a method of selecting a subset of partitions using an overlapping partitioning key (step 435 of FIG. 4) according to one embodiment of the present invention is illustrated by a flow diagram. First, each of the steps is briefly described. Then, a concrete example is discussed with reference to FIG. 6 and FIG. 3.

In one embodiment, a list of selection predicates is evaluated to determine a subset of partitions upon which the query will be executed. At step 520, the list of selection predicates is initialized with the query predicates. Per-partition predicates are loaded at step 525.

Next, At step 530, the per-partition predicates are appended to the list of selection predicates. New predicates are generated based on the per-partition predicates and the query predicates, step 535. Transitivity is one of many properties that can be used to generate new predicates based on known predicates. For example, transitive predicate generation produces the new predicate (a=c) if (a=b) and (b=c) are known predicates.

The newly generated predicates are added to the list of selection predicates at step 540. After generating all possible predicates, all nonconstant per-partition predicates and all newly generated predicates that are not constant predicates are removed from the selection predicate list, step 545. A constant predicate is one that must evaluate to the same value for every row. Therefore, constant predicates can be evaluated at run-time in constant time independent of the number of rows to be fetched.

In step 550, any of the newly generated predicates that can evaluate to the constant UNKNOWN are discarded. For example, the predicate (1=NULL) evaluates to UNKNOWN, but the predicate (1<=:high) does not evaluate to UNKNOWN if the value of high is known not to be NULL.

In step 551, redundant query predicates are discarded by removing them from the selection predicate list. Query predicates can be removed if, given the primary and secondary partitioning predicates, the query predicates are redundant. For example, if the query, Q, is 7/1/67<=ship date<=7/1/70 and $P_i$ is 1/1/68<=ship date<=12/31/68, then the terms of Q may be removed from the corresponding selection predicate, $sel_i$.

At this point, only original, nonredundant query predicates and new constant predicates remain in the list of selection predicates. By keeping only new constant predicates, conflicts between the operation of the Structured Query Language (SQL) where-clause and check constraints can be avoided. Check constraints accept rows if the rows do not evaluate to FALSE. The SQL where-clause selects rows if the rows evaluate to TRUE. Therefore, it is possible for a row to evaluate to UNKNOWN, in which case the same predicate would accept the row as a check constraint but reject the row as a where-clause.

In one embodiment, the per-partition predicates are based upon a single check constraint for the entire partitioned table with per-partition constraint templates. At step 555, prior to evaluating the selection predicates, the per-partition values are bound into the new constant predicates that remain in the list of selection predicates.

Next, at step 560, for each selection predicate corresponding to a partition that has not already been excluded, the remaining constant predicates are evaluated. In one embodiment, it is determined if any of the constant selection predicates evaluate to FALSE, step 565. If any of the constant selection predicates are FALSE, none of the rows in the corresponding partition need to be considered. Accordingly, such partitions are excluded from the query plan at step 575.

If none of the constant selection predicates were found to be FALSE in step 565, the corresponding partition could not be optimized away during compile time and it will be included in the query plan, step 570.

Thus, there are two possible outcomes for a given selection predicate. First, a given selection predicate may be "optimized away" because it is known to be FALSE at compile time (steps 560, 565, and 575). In this case, a partition access operation is removed from the plan. Alternatively, if the selection predicate cannot be optimized away during the compile phase, a run-time test can be generated which, if FALSE, skips the corresponding partition at run-time (step 450).

CHECK CONSTRAINT-BASED IMPLEMENTATION OF OVERLAPPING PARTITION KEYS

Check constraints are typically used to enforce domain limitations on columns of a table. For example, the set of all acceptable values (domain) for a column that stores data values indicating age might be limited to positive integer values. Generally, the limitations are enforced at the time an update operation is attempted Prior to allowing an update operation on the table, a determination is made as to whether the record being modified or inserted complies with any specified domain limitations. For example, a column that stores values indicating gender might be limited to data values of "M," "F," "Male," and "Female." The check constraint for the gender column might be specified by the following predicates: (Gender="M") or (Gender="F") or (Gender="Male") or (Gender="Female"), for example. If an update operation attempted to add a record having a gender data value other than those meeting the check constraint, the transaction would be rejected and an error message might inform the user of the allowable gender values.

Figure 6:
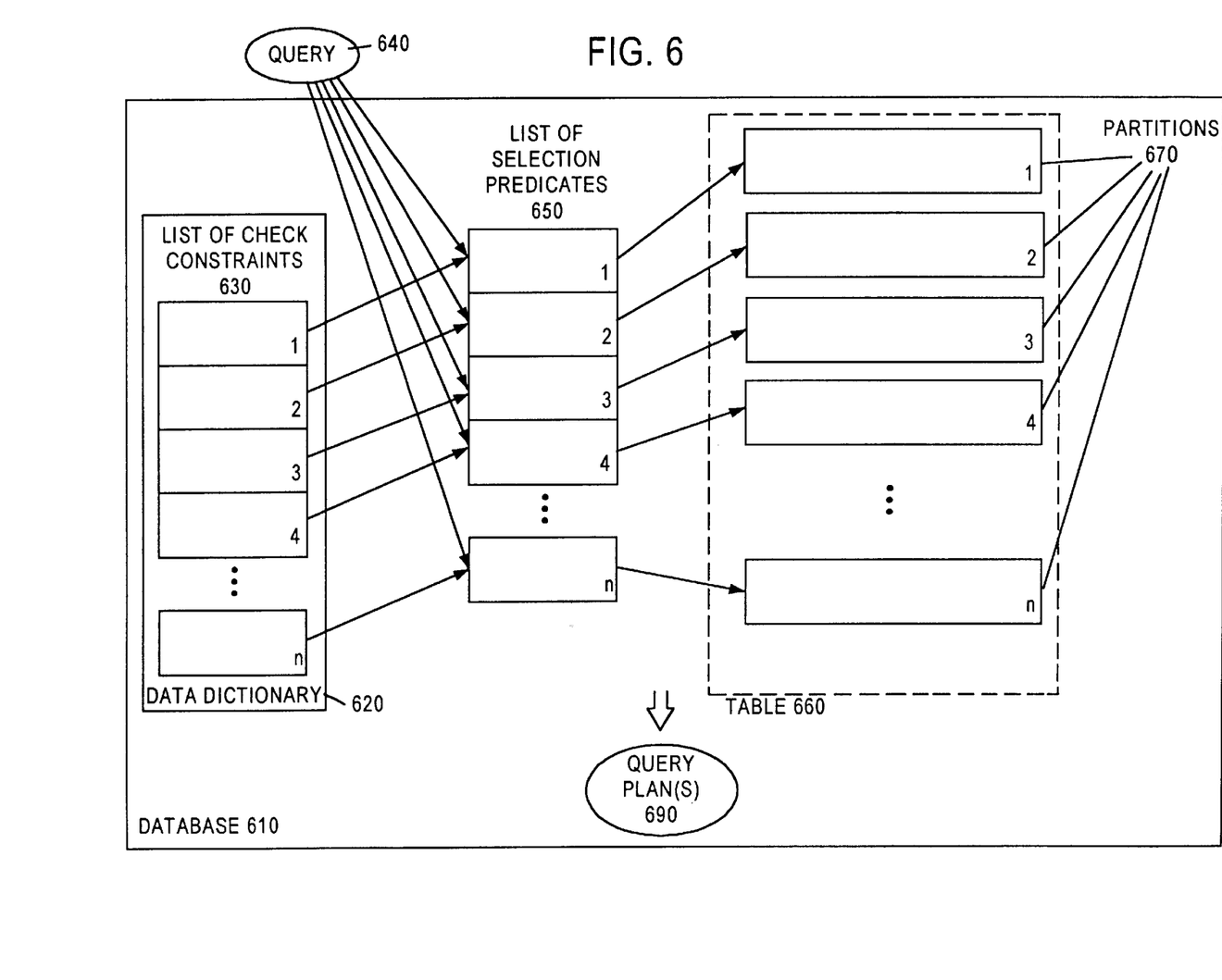
FIG. 6 is an illustration of a database management system using check constraints to implement overlapping partition keys according to one embodiment of the present invention.

FIG. 6 is an illustration of a database management system using check constraints to implement overlapping partition keys according to one embodiment of the present invention. FIG. 6 shows a database 610 containing a partitioned table 660 which has n partitions 670. The database includes a data dictionary 620. The data dictionary 620 has stored therein a list of n check constraints 630. The database also includes a list of selection predicates 650 that are used to select a subset of the partitions 670 for one or more query plans 690.

According to one embodiment, check constraints in the list of check constraints 630 are used to enforce the correlation between the OPkey and the partitioning key. Each element in the list of check constraints has a corresponding partition in the partitioned table 660. An element in the list of check constraints 630 can be represented with predicates. For example, referring to FIG. 3, the check constraint predicates for partition 1 might be expressed as (receive date>=1/1/68) and (receive date<=3/31/69), the check constraint predicates for partition 2 would be (receive date>= 1/1/69) and (receive date<=3/31/70), and the check constraint predicates for partition n would be (receive date>= 1/1/96) and (receive date<=3/31/97).

The following example illustrates the method of FIG. 5 using the check constraint implementation of FIG. 6 and the partitioned table of FIG. 3. Assume, after receipt of query 640, parsing and transitive predicate generation results in query predicate (receive date=3/11/69). Then, in this example, all the elements of the list of selection predicates 650 are initialized to (receive date=3/11/69). Next, the check constraints are appended to the list of selection predicates 650. Predicates (receive date>=1/1/68) and (receive date<= 3/31/69) are added to the element of the list of selection predicates 650 corresponding to partition 1, $sel_1$. Predicates (receive date>=1/1/69) and (receive date<=3/31/70) are added to the element of the list of selection predicates 650 corresponding to partition 2, $sel_2$. Predicates (receive date>= 1/1/70) and (receive date<=3/3/71) are added to the element of the list of selection predicates 650 corresponding to partition 3, $sel_3$. Predicates (receive date>=1/1/96) and (receive date<=3/31/97) are added to the element of the list of selection predicates 650 corresponding to partition n, $sel_n$. Table 1 shows the state of the list of selection predicates 650 after step 530.

TABLE 1

List of Selection Predicates

| Element | Contents |
|---|---|
| 1 | (receive date = 3/11/69), (receive date >= 1/1/68) and (receive date <= 3/31/69) |
| 2 | (receive date = 3/11/69), (receive date >= 1/1/69) and (receive date <= 3/31/70) |
| 3 | (receive date = 3/11/69), (receive date >= 1/1/70) and (receive date <= 3/31/71) |
| . . . | . . . |
| n | (receive date = 3/11/69), (receive date >= 1/1/96) and (receive date <= 3/31/97) |

New predicates are transitively generated based on the check constraints and the query predicates. New predicates (3/11/69>=1/1/68) and (3/11/69<=3/31/69) are added to $sel_1$, new predicates (3/11/69>=1/1/69) and (3/11/69<=3/31/70) are added to $sel_2$, new predicates (3/11/69>=1/1/70) and (3/11/69<=3/31/71) are added to $sel_3$, and new predicates (3/11/69>=1/1/96) and (3/11/69<=3/31/97) are added to $sel_n$. Table 2 shows the state of the list of selection predicates 650 after step 540.

TABLE 2

List of Selection Predicates

| Element | Contents |
|---|---|
| 1 | (receive date = 3/11/69), (receive date >= 1/1/68) and (receive date <= 3/31/69), (3/11/69 >= 1/1/68) and (3/11/69 <= 3/31/69) |
| 2 | (receive date = 3/11/69), (receive date >= 1/1/69) and (receive date <= 3/31/70), (3/11/69 >= 1/1/69) and (3/11/69 <= 3/31/70) |
| 3 | (receive date = 3/11/69), (receive date >= 1/1/70) and (receive date <= 3/31/71), (3/11/69 >= 1/1/70) and (3/11/69 <= 3/31/71) |
| . . . | . . . |
| n | (receive date = 3/11/69), (receive date >= 1/1/96) and (receive date <= 3/31/97), (3/11/69 >= 1/1/96) and (3/11/69 <= 3/31/97) |

Upon evaluating the new constant predicates of $sel_1$, the result is TRUE, for $sel_2$ the result is TRUE, for $sel_3$ the result is FALSE, and for $sel_n$ the result is FALSE. Therefore, in this example, only partition 1 and partition 2 will be scanned.

Figure 7:
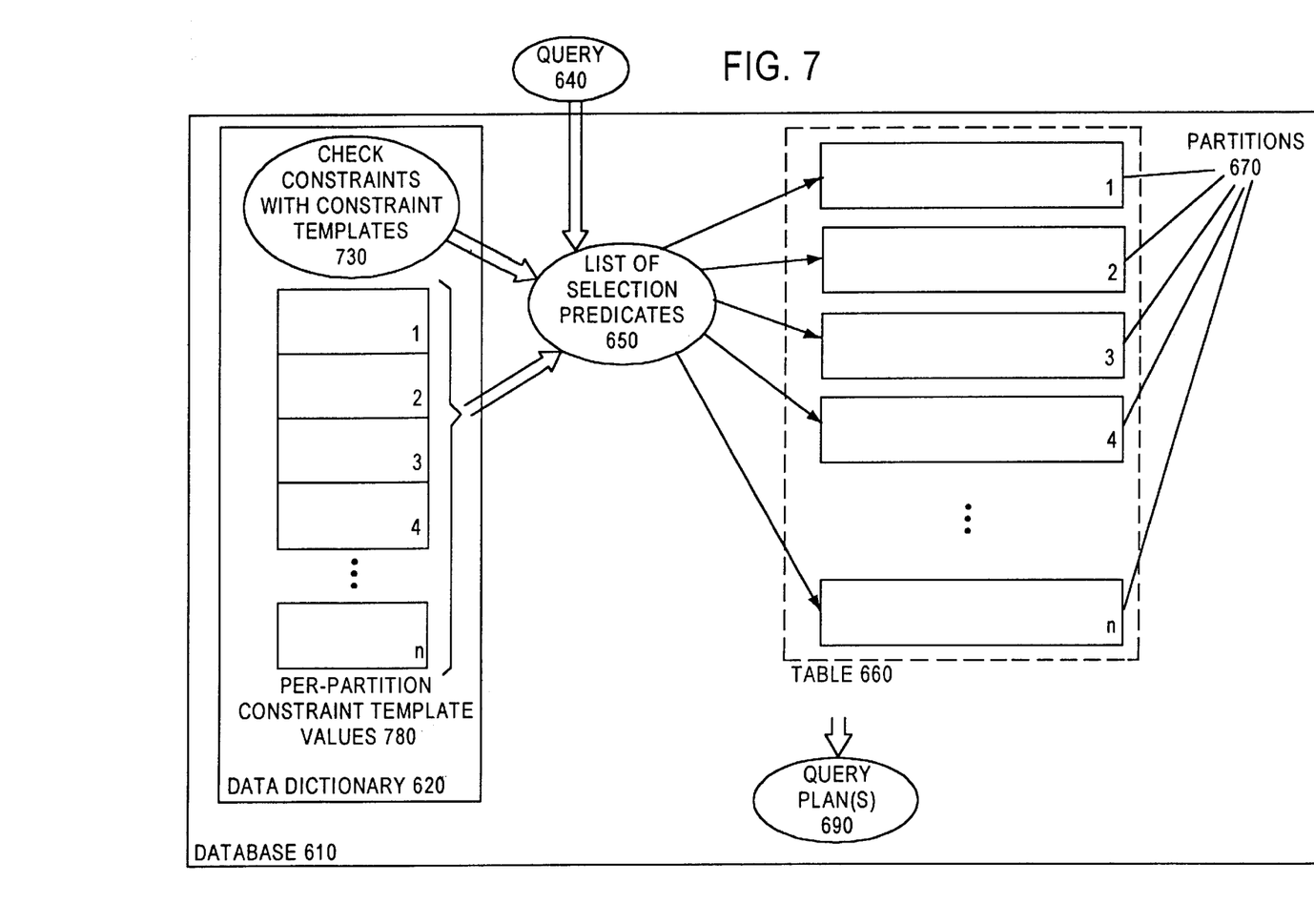
FIG. 7 is an illustration of a database management system using check constraints to implement overlapping partition keys according to another embodiment of the present invention.

FIG. 7 is an illustration of a database management system using check constraints to implement overlapping partition keys according to another embodinent of the present invention. In this embodiment, the data dictionary 620 has stored therein check constraints 730 and per-partition constraint template values 780.

According to one embodiment, check constraints 730 are used to enforce the correlation between the OPkey and the partitioning key for the entire partitioned table 660. The check constraints 730 can be represented with predicates containing constraint templates. The constraint templates act as place holders in the predicates that are replaced with a corresponding per-partition value during the compile phase. For example, the check constraint predicates for FIG. 3 might be expressed as: (receive date>=ship date) and (receive date<=ship date+days), where days represents a constraint template. While the potential exists for each partition to have a different value for the constraint template, in this example, all the partitions have a constraint template value of 90 days.

INDEX-BASED IMPLEMENTION OF OVERLAPPING PARTITION KEYS

Indices are generally used to speed up searches in the column or columns of a table that are indexed. An index provides a mapping between data values to the row or rows in the table containing those data values. An index can be implemented with a hash table, an ordered list, a B-tree, and many other alternative structures. An index can be either local or global. A global index is one structure pointing to rows in every partition. A local index is actually a set of indices, one per partition, where the index for each partition points at rows only in its partition.

Figure 8:
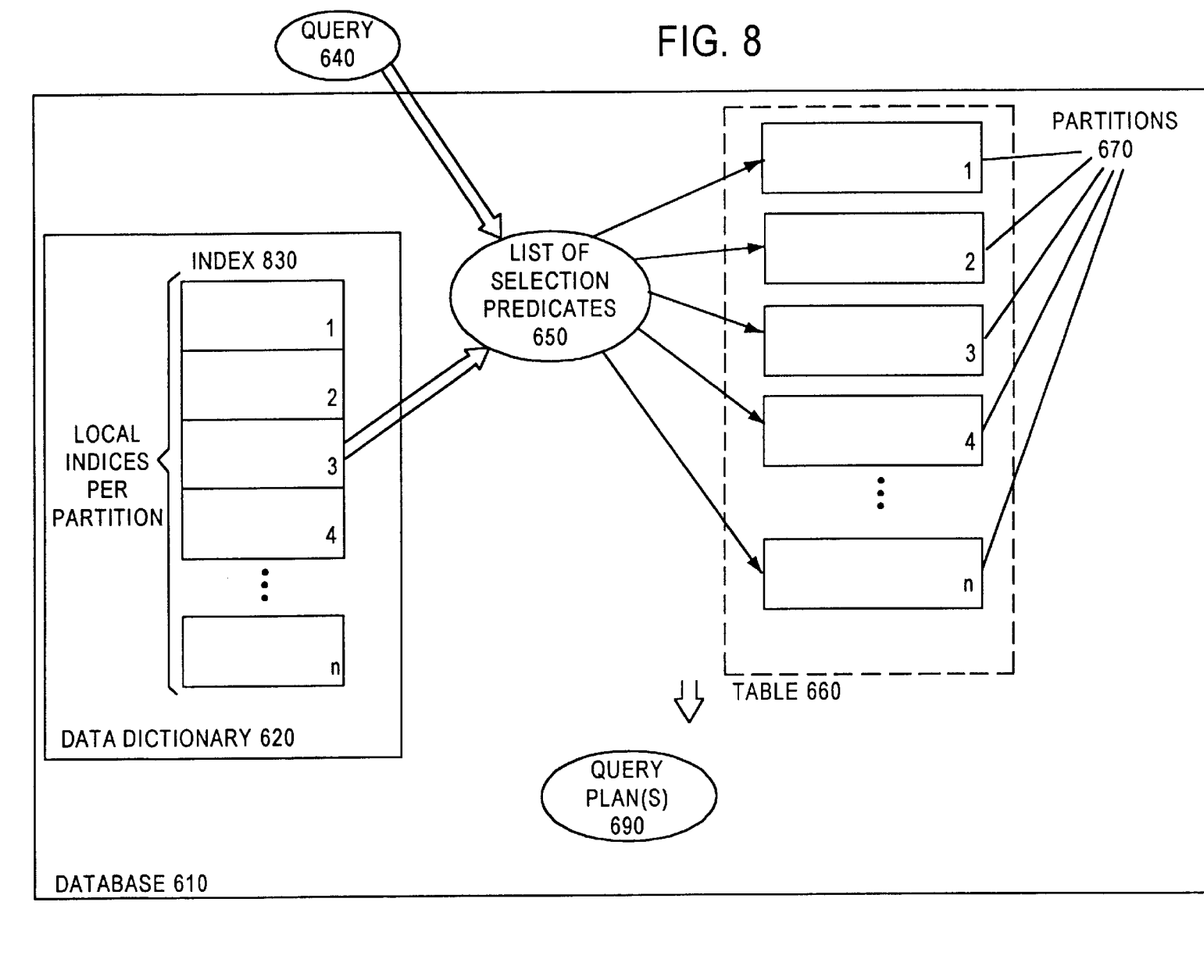
FIG. 8 is an illustration of a database management system using an index to implement overlapping partition keys according to one embodiment of the present invention.

FIG. 8 is an illustration of a database management system using an index to implement overlapping partition keys according to one embodiment of the present invention. In this embodiment, the data dictionary 620 has stored therein an index 830.

In one embodiment, the columns of the OPkey are indexed by the local index 830. The local index 830 contains a set of indices. Each index within the set contains references to all the data values in the OPkey columns for each partition in the partitioned table 660.

In another embodiment the indices track at least high and low values per partition. In this embodiment, the per-partition predicates (OPkey<=:high) and (OPkey>=:low) are appended to the list of selection predicates 650 instead of or in addition to check constraint predicates. At run-time, the high and low values can be fetched from the index and the values can be bound to the generated predicates in the list of selection predicates 650. In yet another embodiment, no index is maintained, but high and low values are tracked for each partition and can be fetched and bound at run-time as in the prior embodiment.

Overlapping Partitions

Partitioning is based on each partition, i, having a partitioning predicate, $P_i$. $P_i$ can be a boolean expression of terms, $T_{ij}$ (e.g., $T_{i1}$ and $T_{i2}$). $T_{ij}$ is a comparison involving the partitioning key and a constant (e.g., ship date>=1/1/69). It is customary that for every primary partitioning key, $P_i$ is TRUE for at most one partition, i, where 1<=i<=n. That is, there exists a one-to-one or many-to-one mapping between data values and partitions. A given value in the partitioning key is mapped to only one partition in the table.

Strict partitioning is generally implemented with n-1 boundary conditions. The n-1 boundary conditions define the upper and lower boundaries for n partitions. One limitation resulting from strict partitioning is the dependence of a given partition's boundaries on the boundaries of the preceding and succeeding partitions. For example, given the constraints $X_i<=P_i<=X_{i+1}$, the upper bound of partition 1 is the lower bound of partition 2, the upper bound of partition 2 is the lower bound of partition 3, etc. Also, with this implementation, there can be no gaps between consecutive partitions. For example, given the constraints above with $X_1=10$, $X_2=20$, and $X_3=30$, all values between 10 and 20 are mapped to partition 1, and all values between 20 and 30 are mapped to partition 2.

Figure 9:
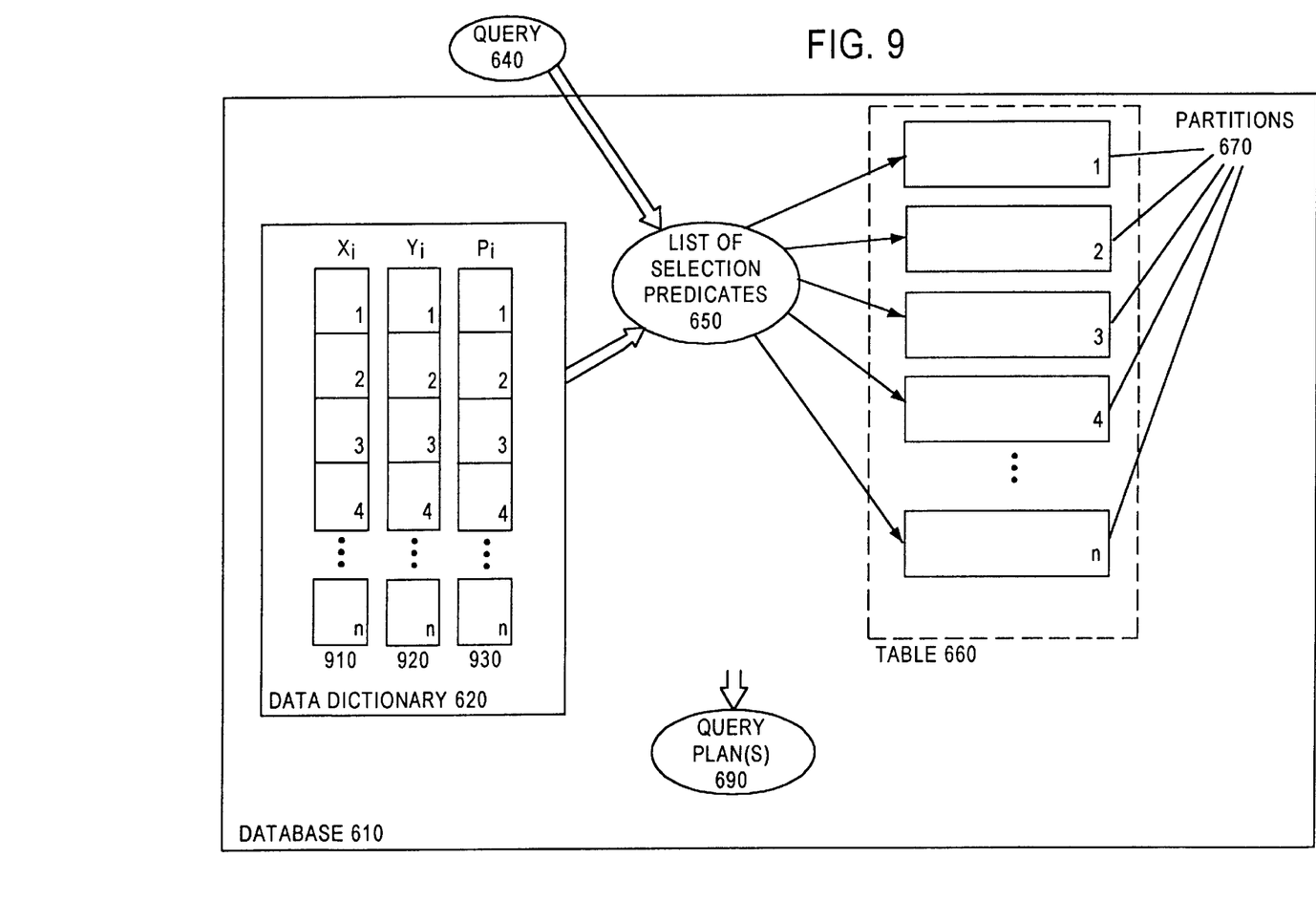
FIG. 9 is an illustration of a database management system using partition value arrays according to one embodiment of the present invention.

FIG. 9 is an illustration of a database management system using partition value arrays. The data dictionary 620 has stored therein two independent partition value arrays, $X_i$ 910 and $Y_i$ 920, and an array of partitioning predicates, $P_i$ 930.

To increase the flexibility of partitioning keys the upper and lower boundaries of partitions are independent. This is accomplished, in one embodiment, using two partition value arrays, $X_i$ 910 and $Y_i$ 920 each having n boundary values, to constrain the partitions instead of using consecutive array locations in the same partition value array. In another embodiment, one partition value array having 2n locations can be used. One portion of the array stores the upper boundary values and another portion stores lower boundary values.

Independent upper and lower bounds allow consecutive partitions to overlap; therefore, in this embodiment, $P_i$ can be TRUE for more than one partition. Thus, a given value in the partitioning key could potentially be mapped to more than one partition. Further, in this embodiment, gaps can exist between consecutive partitions. For example, given the constraints $X_i<=P_i<=Y_i$ where $X_1=10$, $Y_1=15$, $X_2=20$, $Y_2=30$, $X_3=25$, and $Y_3=35$, all values between 10 and 15 are mapped to partition 1, values between 20 and 30 might be in partition 2 or partition 3, and a gap exists between the values 15 and 20.

When a row to be inserted in the partitioned table contains a partitioning key value that maps to more than one partition, a policy must be provided to determine to which of the possible partitions the row should be inserted. Such a policy may be, for example, to always insert the row in the first qualifying partition that is encountered. An alternative policy may be to require a user to select among the qualifying partitions. The present invention is not limited to any particular policy for selecting among qualifying partitions.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for executing queries that specify data from a set of data that has been partitioned into a plurality of partitions based on a first key, the method comprising the computer implemented steps of:

receiving a query that includes a reference to a second key, wherein said second key is not part of said first key but has a predetermined correlation with said first key;

selecting a subset of said plurality of partitions to scan based on said reference to said second key and said predetermined correlation with said first key; and executing said query by scanning only those partitions of said plurality of partitions that belong to said subset of partitions.

2. The method of claim 1 further comprising the steps of:

determining a set of query predicates from said query;

adding said set of query predicates to a set of selection predicates;

adding one or more predicates to said set of selection predicates, said one or more predicates based on said predetermined correlation with said first key; and using said set of selection predicates to select said subset of said plurality of partitions to scan.

3. The method of claim 2 further comprising the steps of:

after said step of adding one or more predicates to said set of selection predicates, transitively generating new predicates based on said set of selection predicates;

adding said new predicates to said set of selection predicates;

removing from said set of selection predicates those of said one or more predicates and said new predicates that cannot be evaluated in constant time;

removing from said set of selection predicates those of said new predicates that can produce an unknown result; and wherein said step of selecting a subset of said plurality of partitions to scan includes
evaluating constant predicates in said set of selection predicates, and
including in said subset those partitions corresponding to selection predicates having constant predicates that evaluate to a predetermined state.

4. The method of claim 2 further comprising the steps of:

excluding from said query plan those partitions of said plurality of partitions corresponding to selection predicates having constant predicates that evaluate to a predetermined state; and including in a query plan only those partitions of said plurality of partitions corresponding to selection predicates having constant predicates that do not evaluate to said predetermined state.

5. The method of claim 1 further comprising the steps of:

receiving a request to modify a subset of data in said set of data, wherein said subset of data includes one or more values for said first key and one or more values for said second key;

determining whether said one or more values for said second key have said predetermined correlation with said one or more values for said first key;

if said one or more values for said second key have said predetermined correlation with said one or more values for said first key, then selecting a target partition based on said one or more values for said first key, and storing said subset of data in said target partition;

if said one or more values for said second key do not have said predetermined correlation with said one or more values for said first key, then generating an error message without adding said subset of data to said set of data.

6. The method of claim 1 further comprising the step of, for each partition of said plurality of partitions, generating data that indicates values of said second key that satisfy said predetermined correlation with values for said first key that correspond to said partition.

7. A method of producing query plans for executing queries on a set of data that has been partitioned into a plurality of partitions based upon a first key, the method comprising the computer implemented steps of:

receiving a query;

selecting a subset of partitions to scan from said plurality of partitions, the selection being performed by
if said query includes a reference to a second key and does not refer to said first key, then determining said subset of partitions to scan based on said reference to said second key and a predetermined correlation between said second key and said first key, wherein said second key is not part of said first key; and producing a query plan which includes only those partitions of said plurality of partitions that belong to said subset of partitions.

8. The method of claim 7 wherein said step of selecting a subset of partitions to scan further comprises the steps of:

if said query includes a reference to said first key and does not refer to said second key, then determining said subset of partitions to scan based on said reference to said first key and said first key; and if said query includes a reference to both said first and second keys, then determining said subset of partitions to scan based on said reference to both said first and second keys and said predetermined correlation.

9. The method of claim 7 further comprising the steps of:

receiving a request to modify said set of data, wherein said request includes a subset of data having one or more values corresponding to one or more attributes from said first key and one or more values corresponding to one or more attributes from said second key; and enforcing said predetermined correlation between said second key and said first key by
applying a first set of predicates to said subset of data to determine whether or not said subset of data complies with said predetermined correlation,
if said subset of data complies with said predetermined correlation, then allowing said request, and
if said subset of data does not comply with said predetermined correlation, then disallowing said request.

10. A method for executing queries that specify data from a set of data that has been partitioned into a plurality of partitions based on a first key, the method comprising the computer implemented steps of:

receiving a query that includes a reference to a second key;

accessing one or more predicates, wherein said one or more predicates represent a predetermined correlation between said first key and said second key;

selecting a subset of said plurality of partitions to scan based on said reference to said second key and said one or more predicates; and executing said query by scanning only those partitions of said plurality of partitions that belong to said subset of partitions.

11. The method of claim 10 wherein said one or more predicates correspond to one or more check constraints, said method further comprising the step of enforcing said predetermined correlation between said first key and said second key with said one or more check constraints, said one or more check constraints limiting values that can be stored in attributes of said second key.

12. The method of claim 10 further comprising the steps of:

adding a set of query predicates derived from said query to a set of selection predicates;

adding one or more predicates to said set of selection predicates, said one or more predicates based on said predetermined correlation with said first key; and using said set of selection predicates to select said subset of said plurality of partitions to scan.

13. The method of claim 12 further comprising the steps of:

after said step of adding one or more predicates to said set of selection predicates, transitively generating new predicates based on said set of selection predicates;

adding said new predicates to said set of selection predicates;

removing from said set of selection predicates those of said one or more predicates and said new predicates that cannot be evaluated in constant time;

removing from said set of selection predicates those of said new predicates that can produce an unknown result; and wherein said step of selecting a subset of said plurality of partitions to scan includes evaluating constant predicates in said set of selection predicates, and including in said subset those partitions corresponding to selection predicates having constant predicates that evaluate to a predetermined state.

14. The method of claim 12 wherein said step of executing said query further comprises the steps of:

including in a query plan only those partitions of said plurality of partitions corresponding to selection predicates having constant predicates that evaluate to a first predetermined state; and excluding from said query plan those partitions of said plurality of partitions corresponding to selection predicates having constant predicates that evaluate to a second predetermined state.

15. A method for executing queries that request data from a set of data that has been partitioned into a plurality of partitions based on a first key, the method comprising the computer implemented steps of:

receiving a query that includes a reference to an attribute that is part of a second key, wherein said second key is not part of said first key but has a predetermined correlation with said first key;

accessing a set of values associated with said attribute;

selecting a subset of said plurality of partitions to scan based on said reference to said attribute and said set of values; and executing said query by scanning only those partitions of said plurality of partitions that belong to said subset of partitions.

16. The method of claim 15 wherein said set of values includes at least a high value and a low value for said attribute for each partition in said plurality of partitions, each high value representing the highest value present in said attribute within the corresponding partition, each low value representing the lowest value present in said attribute within the corresponding partition.

17. The method of claim 16 wherein said set of values are stored as part of an index on said attribute.

18. A method for executing queries on a set of data that has been partitioned into a plurality of partitions based on a first key, wherein said first key includes one or more attributes, the method comprising the computer implemented steps of:

receiving a query that includes a reference to a value from one of said one or more attributes, wherein a first set of data containing said value is stored in a first partition of said plurality of partitions and a second set of data contaning said value is stored in a second partition of said plurality of partitions;

selecting a subset of said plurality of partitions to scan based on said reference, wherein said subset includes said first and second partitions; and executing said query by scanning only those partitions of said plurality of partitions that belong to said subset of partitions.

19. The method of claim 18 further comprising the steps of:

adding a set of query predicates to a set of selection predicates;

generating new predicates based on said set of selection predicates and one or more correlation predicates, said one or more correlation predicates based on a predetermined correlation of a second key with said first key;

removing from said set of selection predicates those of said one or more predicates and said new predicates that cannot be evaluated in constant time;

removing from said set of selection predicates those of said new predicates that can produce an unknown result; and using said set of selection predicates to select said subset of said plurality of partitions to scan.

20. The method of claim 19 further comprising the steps of:

excluding from said subset of said plurality of partitions to scan those partitions of said plurality of partitions corresponding to selection predicates having constant predicates that evaluate to a predetermined state; and including in said subset of said plurality of partitions to scan those partitions of said plurality of partitions corresponding to selection predicates having constant predicates that do not evaluate to said predetermined state.

21. The method of claim 18 further comprising the step of, for each partition of said plurality of partitions, generating a set of predicates that indicate values for said first key that satisfy a predetermined correlation with values for said second key that correspond to said partition.

22. A method for executing queries on a set of data that has been partitioned into a plurality of partitions, the method comprising the computer implemented steps of:

receiving a query that includes a reference to a first key;

accessing data that indicates upper and lower boundary values for said plurality of partitions, wherein said upper and lower boundary values of each of said plurality of partitions are independent of the upper and lower boundary values of the other of said plurality of partitions; and selecting a subset of said plurality of partitions upon which to execute said query based on said reference and said upper and lower boundary values of each of said plurality of partitions.

23. A computer system comprising:

a processor; and a memory coupled to said processor, said memory having stored therein a first set of data that has been partitioned into a plurality of partitions, a second set of data indicating upper boundary values for each of said plurality of partitions, a third set of data, separate from said second set of data, indicating lower boundary values for each of said plurality of partitions, and sequences of instructions which, when executed by said processor, cause said processor to select a subset of said plurality of partitions to scan based on a set of query predicates and said upper and lower boundary values of said plurality of partitions.

24. A machine-readable medium having stored thereon data representing sequences of instructions, said sequences of instructions including sequences of instructions which, when executed by a processor, cause said processor to perform the steps of:

receiving a query on a set of data, wherein said set of data has been partitioned into a plurality of partitions based on a first key, wherein said query includes a reference to a second key, and wherein said second key is not part of said first key but has a predetermined correlation with said first key;

selecting a subset of said plurality of partitions to scan based on said reference to said second key and said predetermined correlation with said first key; and executing said query by scanning only those partitions of said plurality of partitions that belong to said subset of partitions.

25. The method of claim 1 wherein the step of selecting the subset of said plurality of partitions to scan includes selecting at least two of said plurality of partitions.

26. The method of claim 8 wherein said step of selecting the subset of partitions to scan further comprises the step of including all of said plurality of partitions in said subset of partitions to scan if said query does not refer to one of said first key or said second key.

27. The machine-readable medium of claim 24 further comprising instructions for performing the steps of:

determining a set of query predicates from said query;

adding said set of query predicates to a set of selection predicates;

adding one or more predicates to said set of selection predicates, said one or more predicates based on said predetermined correlation with said first key; and using said set of selection predicates to select said subset of said plurality of partitions to scan.

28. The machine-readable medium of claim 27 further comprising instructions for performing the steps of:

after said step of adding one or more predicates to said set of selection predicates, transitively generating new predicates based on said set of selection predicates;

adding said new predicates to said set of selection predicates;

removing from said set of selection predicates those of said one or more predicates and said new predicates that cannot be evaluated in constant time;

removing from said set of selection predicates those of said new predicates that can produce an unknown result; and wherein said step of selecting a subset of said plurality of partitions to scan includes evaluating constant predicates in said set of selection predicates, and including in said subset those partitions corresponding to selection predicates having constant predicates that evaluate to a predetermined state.

29. The machine-readable medium of claim 27 further comprising instructions for performing the steps of:

excluding from said query plan those partitions of said plurality of partitions corresponding to selection predicates having constant predicates that evaluate to a predetermined state; and including in a query plan only those partitions of said plurality of partitions corresponding to selection predicates having constant predicates that do not evaluate to said predetermined state.

30. The machine-readable medium of claim 24 further comprising instructions for performing the steps of:

receiving a request to modify a subset of data in said set of data, wherein said subset of data includes one or more values for said first key and one or more values for said second key;

determining whether said one or more values for said second key have said predetermined correlation with said one or more values for said first key;

if said one or more values for said second key have said predetermined correlation with said one or more values for said first key, then selecting a target partition based on said one or more values for said first key, and storing said subset of data in said target partition;

if said one or more values for said second key do not have said predetermined correlation with said one or more values for said first key, then generating an error message without adding said subset of data to said set of data.

31. The machine-readable medium of claim 24 further comprising instructions for performing the step of, for each partition of said plurality of partitions, generating data that indicates values of said second key that satisfy said predetermined correlation with values for said first key that correspond to said partition.

32. The machine-readable medium of claim 24 wherein the step of selecting the subset of said plurality of partitions to scan includes selecting at least two of said plurality of partitions.

33. A machine-readable medium carrying one or more sequences of instructions for producing query plans for executing queries on a set of data that has been partitioned into a plurality of partitions based upon a first key, wherein execution of the one or more sequences of instructions by one or more processors causes the one or more processors to perform the steps of:

receiving a query;

selecting a subset of partitions to scan from said plurality of partitions, the selection being performed by if said query includes a reference to a second key and does not refer to said first key, then determining said subset of partitions to scan based on said reference to said second key and a predetermined correlation between said second key and said first key, wherein said second key is not part of said first key; and producing a query plan which includes only those partitions of said plurality of partitions that belong to said subset of partitions.

34. A machine-readable medium carrying one or more sequences of instructions for executing queries that specify data from a set of data that has been partitioned into a plurality of partitions based on a first key, wherein execution of the one or more sequences of instructions by one or more processors causes the one or more processors to perform the steps of:

receiving a query that includes a reference to a second key;

accessing one or more predicates, wherein said one or more predicates represent a predetermined correlation between said first key and said second key;

selecting a subset of said plurality of partitions to scan based on said reference to said second key and said one or more predicates; and executing said query by scanning only those partitions of said plurality of partitions that belong to said subset of partitions.

35. A machine-readable medium carrying one or more sequences of instructions for executing queries that request data from a set of data that has been partitioned into a plurality of partitions based on a first key, wherein execution of the one or more sequences of instructions by one or more processors causes the one or more processors to perform the steps of:

receiving a query that includes a reference to an attribute that is part of a second key, wherein said second key is not part of said first key but has a predetermined correlation with said first key;

accessing a set of values associated with said attribute;

selecting a subset of said plurality of partitions to scan based on said reference to said attribute and said set of values; and  executing said query by scanning only those partitions of said plurality of partitions that belong to said subset of partitions.

36. A machine-readable medium carrying one or more sequences of instructions for executing queries on a set of data that has been partitioned into a plurality of partitions based on a first key, wherein said first key includes one or more attributes, wherein execution of the one or more sequences of instructions by one or more processors causes the one or more processors to perform the steps of:

receiving a query that includes a reference to a value from one of said one or more attributes, wherein a first set of data containing said value is stored in a first partition of said plurality of partitions and a second set of data containing said value is stored in a second partition of said plurality of partitions;

selecting a subset of said plurality of partitions to scan based on said reference, wherein said subset includes said first and second partitions; and  executing said query by scanning only those partitions of said plurality of partitions that belong to said subset of partitions.

37. A machine-readable medium carrying one or more sequences of instructions for executing queries on a set of data that has been partitioned into a plurality of partitions, wherein execution of the one or more sequences of instructions by one or more processors causes the one or more processors to perform the steps of:

receiving a query that includes a reference to a first key;

accessing data that indicates upper and lower boundary values for said plurality of partitions, wherein said upper and lower boundary values of each of said plurality of partitions are independent of the upper and lower boundary values of the other of said plurality of partitions; and  selecting a subset of said plurality of partitions upon which to execute said query based on said reference and said upper and lower boundary values of each of said plurality of partitions.

\* \* \* \* \*